June 21, 1938.  P. PADVA ET AL  2,121,211
AUTOMATIC LINE TRACKER
Filed Sept. 30, 1935
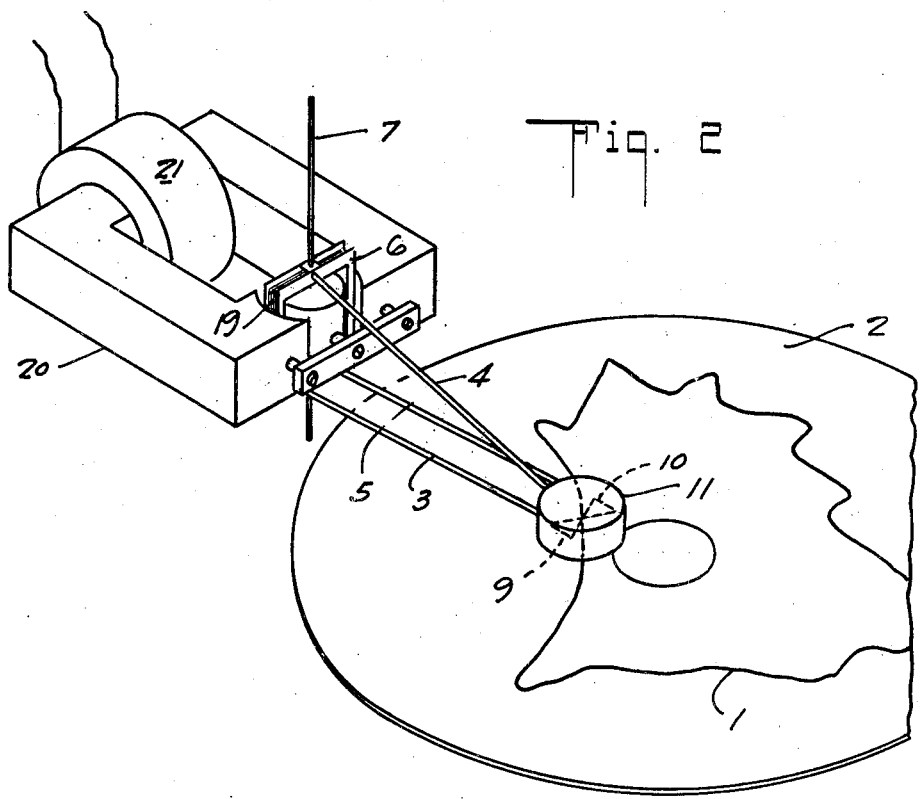
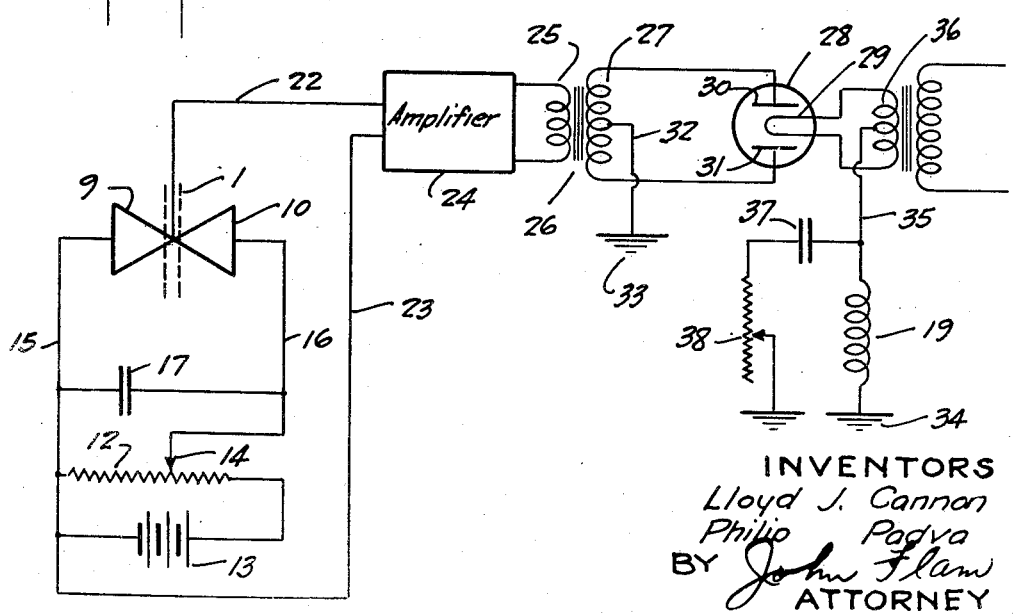
INVENTORS
Lloyd J. Cannon
Philip Padva
BY John Flam
ATTORNEY Patented June 21, 1938

2,121,211

UNITED STATES PATENT OFFICE 2,121,211

AUTOMATIC LINE TRACKER

Philip Padva, Los Angeles, and Lloyd J. Cannon, Taft, Calif., assignors, by direct and mesne assignments, to Cannon & Co., Los Angeles County, Calif., a corporation of California Application September 30, 1935, Serial No. 42,980

18 Claims. (Cl. 250—41.5)

This invention relates to a device for automatically keeping a follower or pointer on a graph or line or curve, as these elements are moved relatively to each other.

Such a device finds useful application in connection with integrators, course setters, or the like; and it is contemplated that other adaptations of the device can be made.

In principle, the device includes a light sensitive structure so arranged as to be capable of relative movement with respect to the line, and to initiate electrical variations in a circuit upon deviation of a predetermined relative position between the structure and the line. The electrical variations are then utilized to affect (if necessary, through amplifiers), a system mechanically for maintaining the structure and the line in the predetermined relative position.

It is accordingly an object of the invention to provide a device of this character, capable of maintaining the follower in the line and to keep it thereon.

It is another object of the invention to provide a system of this character that is simple in construction and reliable in operation.

In particular, the light sensitive structure includes a pair of light sensitive cells, such as selenium cells or photoelectric cells, which may be separately mounted or mounted in a common envelope, and so arranged that the current flow to the restoring mechanism is a function of the differential in current flow between the cells. It is obvious that the system thus operates on variations in the amount of light respectively received by the cells; and that there must be a difference in the degree of opacity or light reflecting quality between the line or graph to be traced, and the medium upon which it is carried. It is immaterial whether the line or the carrying medium is the denser of the two; or whether the light thrown upon the cells is reflected or transmitted. For the sake of simplicity, however, the invention will be described in connection with transmitted light, the line or graph being substantially non-reflective and the line carrying medium having good transmitting qualities.

This invention possesses many other advantages, and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawing:

Figure 1 is a schematic wiring diagram of an automatic line tracker incorporating the invention; and Fig. 2 is a pictorial view of the essential mechanical elements of the invention.

The line 1 adapted to be tracked is shown in this instance as carried on a circular dial 2. The width of the line 1 is shown somewhat exaggerated in Fig. 1 for the sake of clarity. The dial 2 may be a card utilized in connection with a recording instrument. In the present instance line 1 is shown as more opaque than the supporting medium comprising the dial 2.

The tracker mechanism includes a movable mechanism or member comprising a line tracker shown in this instance as being formed of rigid supporting arms 3, 4 and 5 projecting from a frame 6. This frame 6 may preferably be supported for rotary movement on a torsion wire 7, having a predetermined initial twist to urge the frame 6 resiliently in a definite direction. The oscillatory motion of frame 6 is utilized in any desired way to affect any translating device, such as an integrator in common use in connection with planimeters, although the line tracker can be utilized for other purposes. It is of course understood that the dial 2 carrying the line 1 is intended to be rotated and the tracker mechanism is so arranged that it swings back and forth in accordance with the convolutions of the line 1. This mechanism is rendered as light as possible to reduce mechanical inertia; and furthermore, the arms 3, 4 and 5 are made long in order to reduce the acceleration of the frame 6 and its coil 19.

Use is made of a pair of light sensitive cells 9 and 10 carried in an appropriate housing 11 supported on the arms 3, 4 and 5. These cells 9 and 10 can be of any appropriate design, such as selenium cells or cells depending upon emission of electrons from a suitable prepared surface, now commonly known as photoelectric cells. The important function of these cells is to respond to variations in the quantity of light received by them, so as to affect an electric circuit and thereby initiate a controlling function for the line tracker structure. Normally the cells 9 and 10 are arranged closely above the surface of the dial 2 which carries the line 1, and their active light sensitive surfaces are exposed and opposed to the area of the dial 2 immediately below the cells. In the present instance these light sensitive cells are influenced by the light transmitted through the dial 2.

The line tracking position of the cells 9 and 10 with relation to line 1 is indicated in Fig. 1. The line 1 in this line tracking position slightly overlaps both of the active cell surfaces 9 and 10, although this overlapping at the stable position is not necessarily equal for both cells. It is obvious that when there is a deviation from this stable line tracking position, say for example, by relative motion of line 1 toward the right as viewed in Fig. 1, more of cell 10 will be obscured and more of cell 9 will be exposed by the line 1. On the other hand should the line 1 move relatively to the cells 9 and 10 toward the left as viewed in Fig. 1, more of the active surface of cell 10 will be exposed and more of the active surface of cell 9 will be obscured by the line. This deviation from the stable tracking position is utilized to create a force urging the line tracker 3—4—5—11 toward the desired position.

In the present instance the cells 9 and 10 are shown as having triangular active areas with end apexes substantially touching and representing the desired center of the line 1. These cells are shown in the present instance as energized by the aid of a potentiometer arrangement including the potentiometer resistance 12 and a source of electrical energy such as the battery 13. A variable contact point 14 is intended to make contact at any desired intermediate point of the resistance 12, the cells 9 and 10 being placed in series by the aid of the connections 15 and 16.

The dial 2 can be exposed to light produced by an ordinary electric lamp, such as a lamp fed from an ordinary alternating current commercial circuit; or else a variable illumination can be obtained by interposing a light chopper or modulating device between a lamp of constant intensity and dial 2. Of course such an alternating electromotive force produces light pulses having a predominating fundamental frequency of twice that of the alternating current source. Accordingly and under normal conditions a pulsating current is produced flowing through the cells 9 and 10 in series, the pulsations corresponding to these light variations occasioned by the alternating current source for the lamp. The pulsatory component of the current finds a path through a comparatively large condenser 17 bridging the potentiometer.

By appropriate design of the cells 9 and 10 one of the pair of cells is made to respond more strongly to light influences than the other. This can be accomplished in any number of numerous well known ways. Thus when line 1 is in the desired tracking position of Fig. 1, the cell 9 can be arranged to predominate over cell 10.

In order to utilize this effect, to hold the relative position of line 1 and the tracker member in the desired tracking position, the predominating effect of cell 9 is caused to produce a force urging the tracker member in one direction; but this force is opposed by another force, which two forces balance while the stable position exists.

Thus as shown in Fig. 2, the tracker member 3—4—6—11 is urged, as heretofore stated, in one direction by the torsion or twist of wire 7. The tracker member, however, is urged in the opposite direction by an electrodynamic effect which is responsive to the degree of unbalance between cells 9 and 10. Thus for this purpose there is a dynamic coil 19 mounted upon frame 6 and placed in the field of a magnet 20. This magnet 20 has opposing pole faces between which the frame 6 can rotate. The magnetic field can be obtained in any desired manner, as by the aid of an energizing coil 21 mounted upon the magnetic frame 20 and appropriately connected to any direct current source. In order to reduce mechanical inertia, the magnetic core inside of frame 6 is stationary and supported independently thereof.

It is well understood that the torque created by the current flowing through the coil 19 is dependent upon the strength of the current. It is opposed by the torsion of wire 7. Accordingly when line 1 and cells 9 and 10 are in the desired tracking position, the normal unbalance between the response of cells 9 and 10 is just sufficient to create a force to balance the force exerted by the wire 7, whereby the stable tracking position is maintained.

However, should line 1 move relatively with respect to cells 9 and 10 toward the right as viewed in Fig. 1, the cell 9 is still more predominant over cell 10 and the result is that the force exerted by the aid of the dynamic coil 19 momentarily overcomes the force exerted by wire 7 and moves the frame 6 in such a direction as to restore the line 1 to the stable tracking position. If on the other hand the line 1 moves relatively to cells 9 and 10 toward the left as viewed in Fig. 1, the degree of predominance of the response of cell 9 over that of cell 10 is reduced. Accordingly, a reduced force is produced by the dynamic coil 19 and the wire 7 moves the frame 6 now in the opposite direction until this balance is reestablished, and line 1 is restored to the stable tracking position.

The electric circuits whereby these effects are produced include conductors 22 and 23. Conductor 22 connects to the common terminal of cells 9 and 10 and conductor 23 connects to conductor 15 or 16, thereby placing these two cells 9 and 10 in parallel. It is apparent that a circuit completed between conductors 22 and 23 will carry a differential current corresponding to the difference in the degree of response of cells 9 and 10. This differential current is of course a current having pulsations with a predominating fundamental frequency corresponding to twice the frequency of the source of illumination.

This differential current thus varying in accordance with the relative position of the line 1 to cells 9 and 10 is utilized to affect vacuum tube amplifiers, in order to build up this rather small differential current to a desired strong value.

The output of the amplifier 24 is shown as supplying a current to the primary coil 25 of a transformer 26 having a secondary coil 27. This secondary coil 27 is intended to be connected to a rectifier 28 consisting of a filament or cathode 29 and two plates or anodes 30 and 31. The ends of the coil 27 are respectively connected to the anodes 30 and 31. The intermediate point of coil 27 is connected as by conductor 32 and grounds 33 and 34 to the dynamic coil 19. The other terminal of dynamic coil 19 is connected by way of conductor 35 to a center tap of the heating transformer coil 36 of filament 29.

As is well understood, this scheme of connections provides a rectified direct or pulsating current to coil 19 corresponding to the differential current flowing in the photoelectric cell circuit.

In order to stabilize the tracker mechanism 3—4—5—6—11 against oscillations, use is made of an oscillating control circuit paralleling coil 19. This circuit includes a large fixed condenser 37 and a variable resistance 38. By appropriate adjustment of resistance 38 the damping or stabilizing effect of the circuit can be fixed at an optimum value.

The mode of operation of the system can now be summarized. As the dial 2 is rotated, the line 1 sweeps past the cells 9 and 10. As the line, from whatever cause, deviates from the stable relative position illustrated in Fig. 1, the cells 9 and 10 cause corresponding variations in the differential current flowing through conductors 22 and 23. This current is amplified and rectified and is finally passed to the dynamic coil 19, which then acts to move the line tracker to restore the relative positions of the line and the cells to the stable position. The line tracker rotates the frame 6 to and fro in accordance with the configuration of the line or graph 1.

We claim:

1. In a device of the character described, a tracker member for following a line on a chart, means creating a pair of continuously active opposed forces for holding said member in a definite position with respect to a line, and means for altering the relation between the forces in response to deviation from the position for maintaining said tracker and line to tracking position.

2. In a device of the character described, a movable tracker member for a line on a chart, a circuit including a light sensitive structure for controlling the current in the circuit, carried by the member, and so arranged with respect to the line that variations in the relative position of the line and the structure causes a variation in the current, and means responsive to and operating in accordance with variations in the current for maintaining said member in line tracking position.

3. In a device of the character described, an electromagnetic coil structure, a line tracker for a chart adapted to be actuated in accordance with the degree of energization of the coil, a resilient member opposing said actuation, and means responsive to deviation of the line tracker from tracking position for varying the coil energization.

4. In a device of the character described, an electromagnetic coil structure, a line tracker for a chart adapted to be actuated in accordance with the degree of energization of the coil, a resilient member opposing said actuation, a light sensitive structure carried by the tracker and arranged to be affected in accordance with the extent of deviation from tracking position, and a circuit between the structure and the coil and responding to the variations of illumination produced on the light sensitive structure.

5. In a device of the character described, an electroresponsive element for inaugurating motion, a line tracker for a chart adapted to be actuated in accordance with the degree of energization of the element, and means responsive to deviation of the line tracker from tracking position for varying the degree of energization of the electroresponsive element.

6. In a device of the character described, an electroresponsive element for producing motion, a line tracker for a chart adapted to be actuated in accordance with the degree of energization of the element, a light sensitive structure carried by the tracker and arranged to be affected in accordance with the extent of deviation of tracking position, and a circuit between the structure and the electroresponsive element and responding to the variations in illumination produced on the light sensitive structure.

7. In a device of the character described, a line tracker, electroresponsive means for maintaining the relative position of the line tracker and a line on a chart, a circuit including a photoelectric device for converting photo radiations in electric current flow in the circuit, said device being so arranged that deviation of the tracker from tracking position causes a variation in the current flow in the circuit, the direction of said variation being selective with respect to the direction of deviation, and means actuated in accordance with the magnitude of said variation to maintain the tracker in tracking position.

8. In a device of the character described, a line tracker, electroresponsive means for maintaining the relative position of the line tracker and a line on a chart, a circuit including a photoelectric device for converting photo radiations into electric current flow in the circuit, said device being so arranged that deviation of the tracker from tracking position causes a variation in the current flow in the circuit, the direction of said variation being selective with respect to the direction of deviation, an amplifier for said variation, and means connected to the amplifier and responsive to the direction and magnitude of the variation for maintaining the tracker in tracking position.

9. In a device of the character described, an electroresponsive element for inaugurating motion, a line tracker for a chart adapted to be actuated in accordance with the degree of energization of the element, means responsive to deviation of the line tracker from tracking position for varying the energization of the electroresponsive element in accordance with said deviation, and means for reducing the undesired oscillations of the means responsive to the deviations.

10. In a line tracker device, a pair of light sensitive cells having adjacent portions and so arranged that a line on a chart comes between or can partially overlap both cells, whereby a variation in the response of both cells is obtained when overlapped by the line as the relative position of the line with respect to the cells varies, means for energizing said cells, and means selectively responsive to the direction of deviation from desired tracking position of the line for maintaining the cells at said position.

11. In a line tracker device, a pair of light sensitive cells having adjacent portions and so arranged that a line on a chart comes between or can partially overlap both cells, whereby a variation in the response of both cells is obtained when overlapped by the line as the relative position of the line with respect to the cells varies, means for energizing said cells, and an electroresponsive motion producing device affected by the variation in cell response, for maintaining the relative position of the line and the cells at a desired tracking position.

12. In a line tracker device, a pair of light sensitive cells having adjacent portions and so arranged that a line on a chart comes between or can partially overlap both cells, whereby a variation in the response of both cells is obtained when overlapped by the line as the relative position of the line with respect to the cells varies, means for energizing said cells, an amplifier responding selectively to the direction of the variation, and an electroresponsive device connected to the amplifier for maintaining the relative position of the line and the cells at a desired tracking position.

13. In a line tracker device, a pair of light sensitive cells having adjacent portions and so arranged that a line on a chart comes between or can partially overlap both cells, whereby a variation in the response of both cells is obtained when overlapped by the line as the relative position of the line with respect to the cells varies, means for energizing said cells, said cells being so arranged that their response is unequal when the line and cells are in stable tracking position, a movable member for varying the relative position of the line to the cells, means responsive to the difference in response of the cells to urge the movable member in one direction, and means providing a force for urging the movable member in the other direction.

14. In a line tracker device, a pair of light sensitive cells having adjacent portions and so arranged that a line on a chart comes between or can partially overlap both cells, whereby a variation in the response of both cells is obtained when overlapped by the line as the relative position of the line with respect to the cells varies, means for energizing said cells, said cells being so arranged that their response is unequal when the line and the cells are in stable tracking position, an electric circuit for the cells in which a differential current is produced in accordance with the difference between the degrees of response of the cells, a movable tracker member, means for urging said member in one direction in accordance with said differential current, and means providing a force for urging said member in the other direction.

15. In a line tracker device, a pair of light sensitive cells having adjacent portions and so arranged that a line on a chart comes between or can partially overlap both cells, whereby a variation in the response of both cells is obtained when overlapped by the line as the relative position of the line with respect to the cells varies, means for energizing said cells, said cells being so arranged that their response is unequal when the line and the cells are in stable tracking position, an electric circuit for the cells in which a differential current is produced in accordance with the difference between the degrees of response of the cells, a movable tracker member, means for urging said member in one direction in accordance with said differential current, means providing a force for urging said member in the other direction, and means for stabilizing said member against undesired oscillations.

16. In a line tracker device, a pair of light sensitive cells having adjacent portions and so arranged that a line on a chart comes between or can partially overlap both cells, whereby a variation in the response of both cells is obtained when overlapped by the line as the relative position of the line with respect to the cells varies, means for energizing said cells, said cells being so arranged that their response is unequal when the line and the cells are in stable tracking position, an electric circuit for the cells in which a differential current is produced in accordance with the difference between the degrees of response of the cells, an amplifier operated in accordance with said differential current, an electroresponsive device connected to the output of the amplifier, a movable tracker member urged in one direction by said electroresponsive device, means providing a force for urging said member in the other direction, and means for stabilizing said member against undesired oscillations.

17. In a device of the character, described, a tracker member for a line on a chart, electroresponsive means for creating a force for maintaining said member in tracking position, and means for stabilizing said member against undesired oscillations.

18. In a device of the character described, a tracker member for a line on a chart, electroresponsive means for creating a force for maintaining said member in tracking position, and means for stabilizing said member against undesired oscillations, comprising a circuit paralleling said electroresponsive means and including a capacity and means for varying the effect of the capacity.

PHILIP PADVA.
LLOYD J. CANNON.